(12) United States Patent
Watabe (10) Patent No.: US 10,919,179 B2
(45) Date of Patent: Feb. 16, 2021

(54) WEB FORMING DEVICE AND SHEET MANUFACTURING APPARATUS

(71) Applicant: SEIKO EPSON CORPORATION, Tokyo (JP)

(72) Inventor: Manabu Watabe, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/442,601

(22) Filed: Jun. 17, 2019

(65) Prior Publication Data

US 2019/0381690 A1    Dec. 19, 2019

(30) Foreign Application Priority Data

Jun. 18, 2018 (JP) .................................. 2018-115514

(51) Int. Cl.
*D21F 9/00* (2006.01)
*B27N 3/04* (2006.01)
*D04H 1/732* (2012.01)

(52) U.S. Cl.
CPC .............. *B27N 3/04* (2013.01); *D04H 1/732* (2013.01); *D21F 9/00* (2013.01)

(58) Field of Classification Search
USPC ....................................................... 162/261
See application file for complete search history.

(56) References Cited

U.S. PATENT DOCUMENTS

| 2015/0204015 A1* | 7/2015 | Gomi | B29C 35/0277 |
| | | | 162/261 |
| 2016/0229129 A1* | 8/2016 | Ueno | B29B 7/38 |
| 2016/0258112 A1* | 9/2016 | Gomi | D21F 9/00 |
| 2016/0273164 A1* | 9/2016 | Omagari | D21B 1/08 |
| 2016/0288435 A1* | 10/2016 | Higuchi | D21F 9/00 |
| 2018/0305868 A1* | 10/2018 | Kunugi | D21F 9/00 |

FOREIGN PATENT DOCUMENTS

| JP | 2006-132009 A | 5/2006 |
| JP | 2011-174210 A | 9/2011 |

* cited by examiner

*Primary Examiner* — Mark Halpern
(74) *Attorney, Agent, or Firm* — Global IP Counselors, LLP (57) ABSTRACT

A web forming device and sheet manufacturing apparatus can manufacture sheets of desired dimensions regardless of the location. The web forming device includes: a disperser configured to disperse in air defibrated material containing a defibrated material of defibrated fiber; an accumulator configured to accumulate the defibrated material dispersed by the disperser; a housing enclosing a space between the disperser and the accumulator; a suction device disposed on the opposite side of the accumulator as the disperser; and a fastening assembly that can be disassembled into a first fixing assembly and a second fixing assembly. The disperser is affixed to the first fixing assembly, and the accumulator, housing, and suction device are affixed to the second fixing assembly.

6 Claims, 6 Drawing Sheets

WEB FORMING DEVICE AND SHEET MANUFACTURING APPARATUS

BACKGROUND

1. Technical Field

The present invention relates to a web forming device and a sheet manufacturing apparatus.

This application is based upon Japanese Patent Application 2018-115514 filed on Jun. 18, 2018, the entire contents of which are incorporated by reference herein.

2. Related Art

As concerns about environmental protection have increased, so has demand for reducing paper consumption in the workplace, recycling paper in the workplace, and printing to paper by methods enabling reusing the paper. Devices for recycling previously used recovered paper by defibrating the recovered paper to produce defibrated material, and making new paper products from the defibrated material are also known. See, for example, JP-A-2006-132009.

The device described in JP-A-2006-132009 has a conveyor that conveys defibrated material, a supplier that supplies defibrated material onto the conveyor, and a compressor that compresses the supplied defibrated material, and houses each of these components in a single enclosure. This device is produced by separately manufacturing and then assembling the conveyor, supplier, and compressor.

However, when the device disclosed in JP-A-2006-132009 is installed in a relatively small room, installation may be difficult depending on the size of the entrance. In addition, when the components of the system are disassembled and then reassembled at the work site, parts may become misaligned during assembly, resulting in performance and quality problems.

SUMMARY OF THE INVENTION

The present invention is directed to solving at least part of the foregoing problem, and may be embodied as described below.

A web forming device according to another aspect of the invention includes: a disperser configured to disperse in air defibrated material containing a defibrated material of defibrated fiber; an accumulator configured to accumulate the defibrated material dispersed by the disperser; a housing enclosing a space between the disperser and the accumulator; a suction device disposed on the opposite side of the accumulator as the disperser; and a fastening assembly that can be disassembled into a first fixing assembly and a second fixing assembly. The disperser is affixed to the first fixing assembly, and the accumulator, housing, and suction device are affixed to the second fixing assembly.

A sheet manufacturing apparatus according to another aspect of the invention includes a disperser configured to disperse in air defibrated material containing a defibrated material of defibrated fiber; an accumulator configured to accumulate the defibrated material dispersed by the disperser; a suction device disposed on the opposite side of the accumulator as the disperser; and a pressure roller configured to compress defibrated material accumulated on the accumulator; and a fastening assembly that can be disassembled into a first fixing assembly and a second fixing assembly. The disperser is affixed to the first fixing assembly, and the accumulator, suction device, and pressure roller are affixed to the second fixing assembly.

Other objects and attainments together with a fuller understanding of the invention will become apparent and appreciated by referring to the following description and claims taken in conjunction with the accompanying drawings.

DESCRIPTION OF EMBODIMENTS

A preferred embodiment of a sheet manufacturing apparatus according to the present invention is described below with reference to the accompanying figures.

Embodiment

Figure 1:
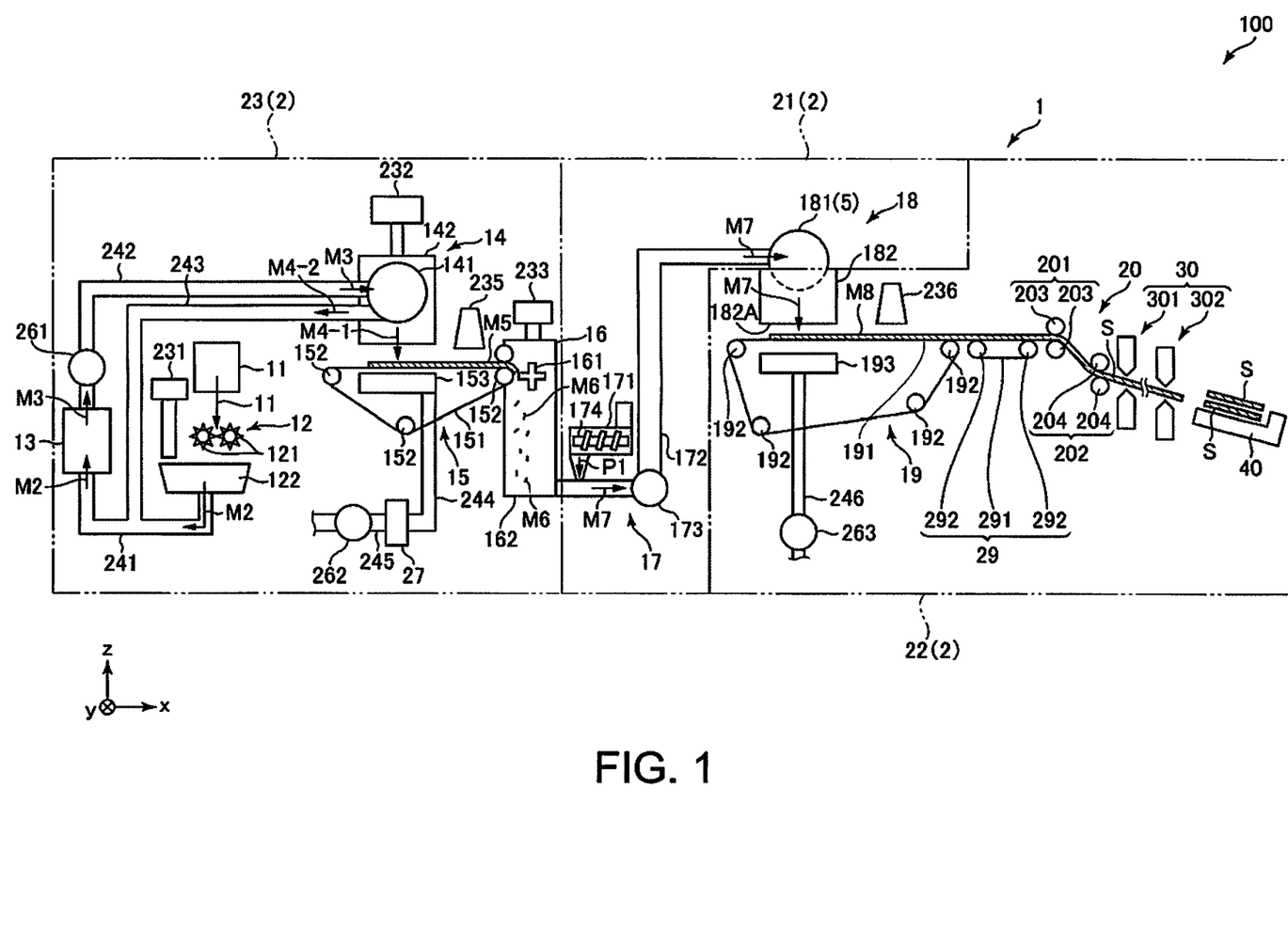
FIG. 1 schematically illustrates the configuration (partially in section) of a preferred embodiment of a web forming device and sheet manufacturing apparatus according to the invention.
Figure 2:
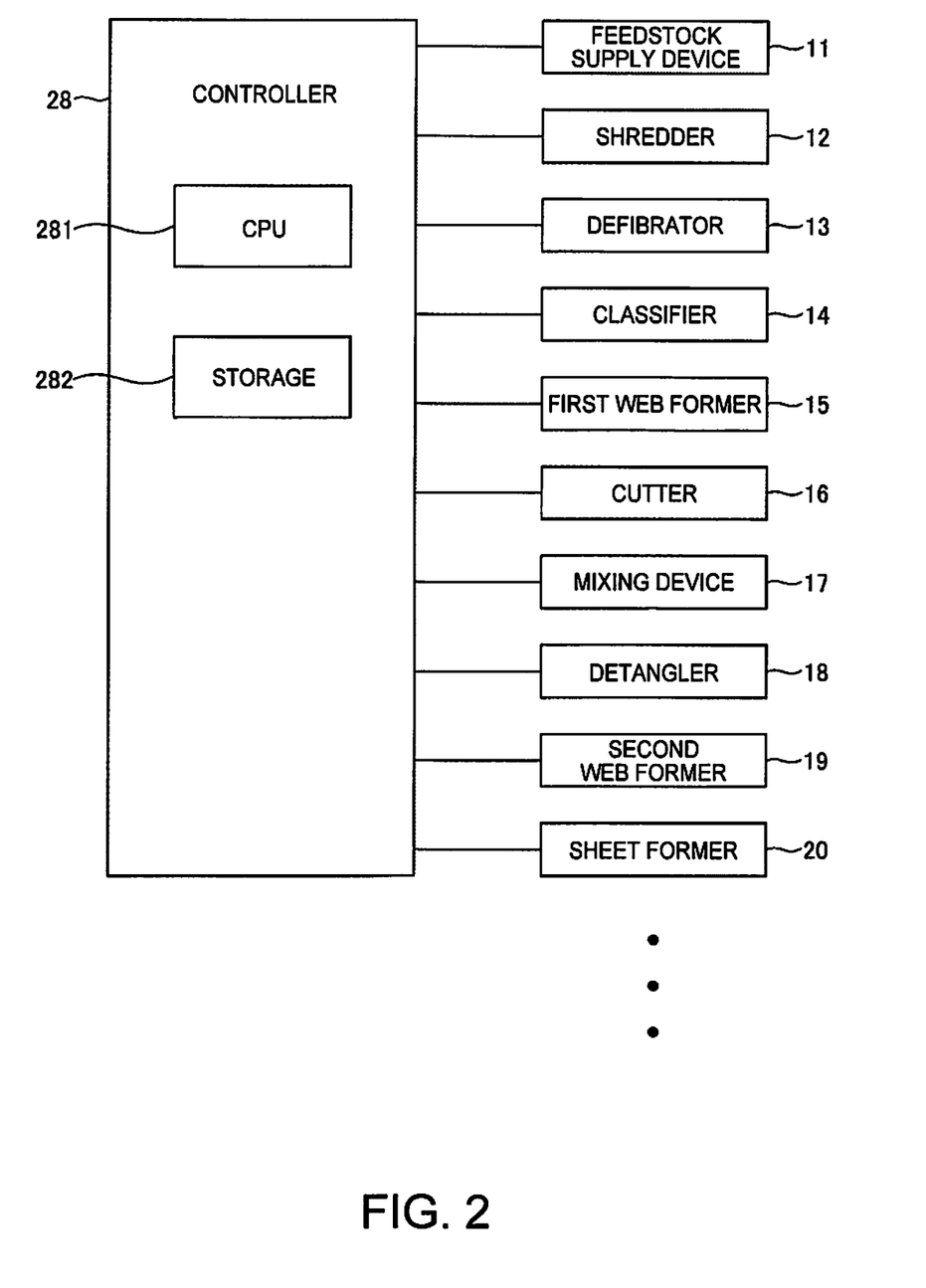
FIG. 2 is a block diagram of the sheet manufacturing apparatus shown in FIG. 1.
Figure 3:
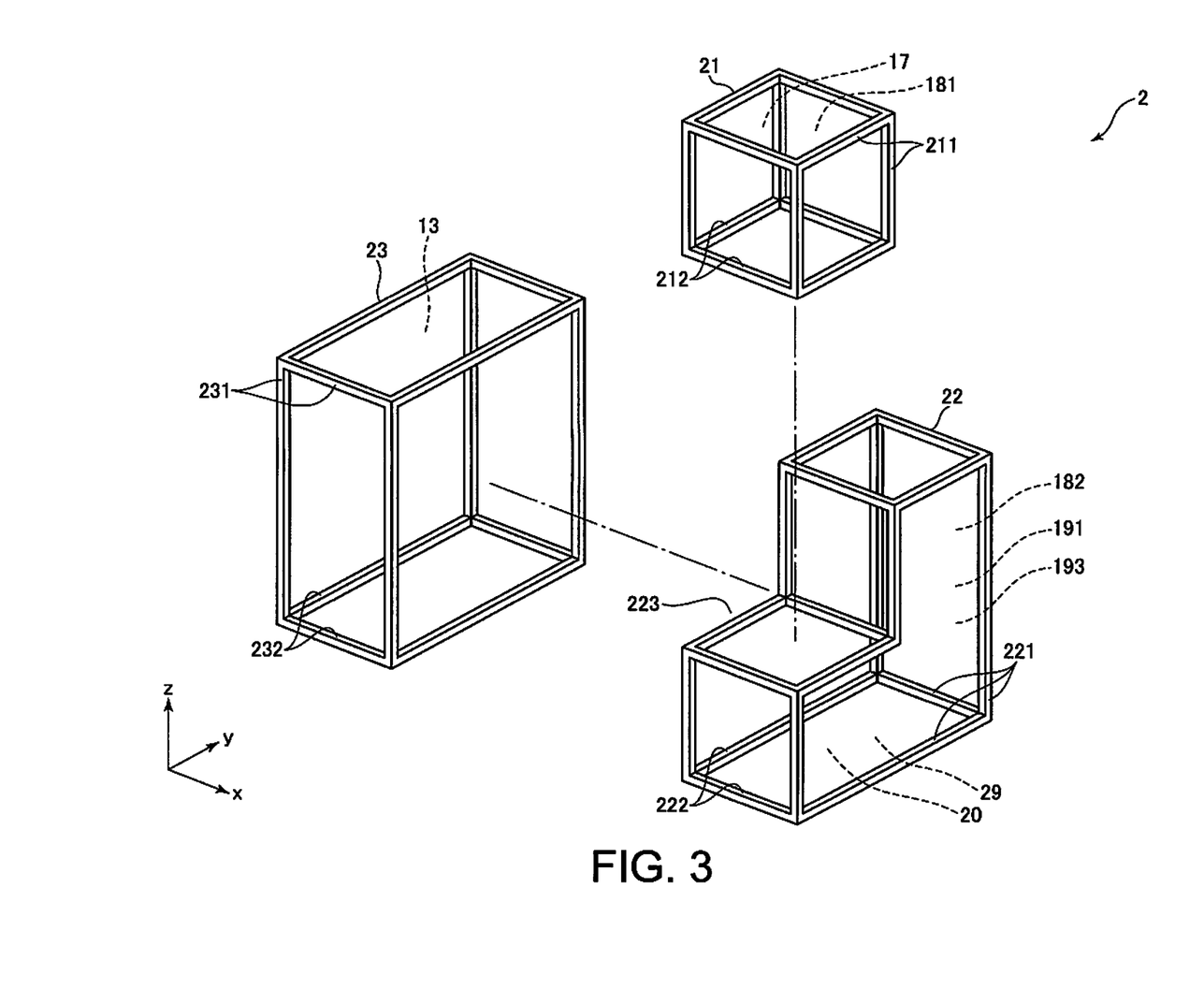
FIG. 3 is an exploded oblique view of the assembly frames of the sheet manufacturing apparatus shown in FIG. 1.
Figure 4:
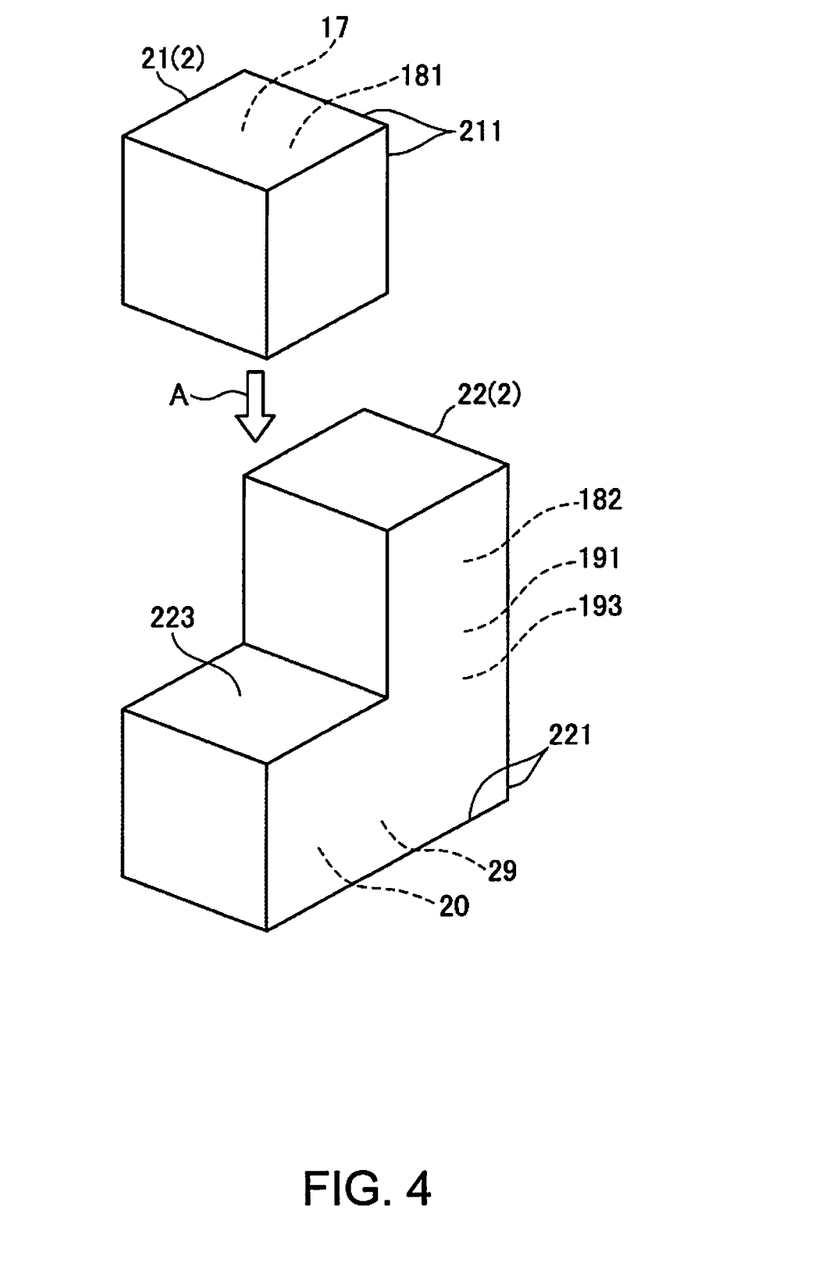
FIG. 4 is an oblique view showing an example of a step in the procedure for assembling the assembly frames shown in FIG. 3.
Figure 5:
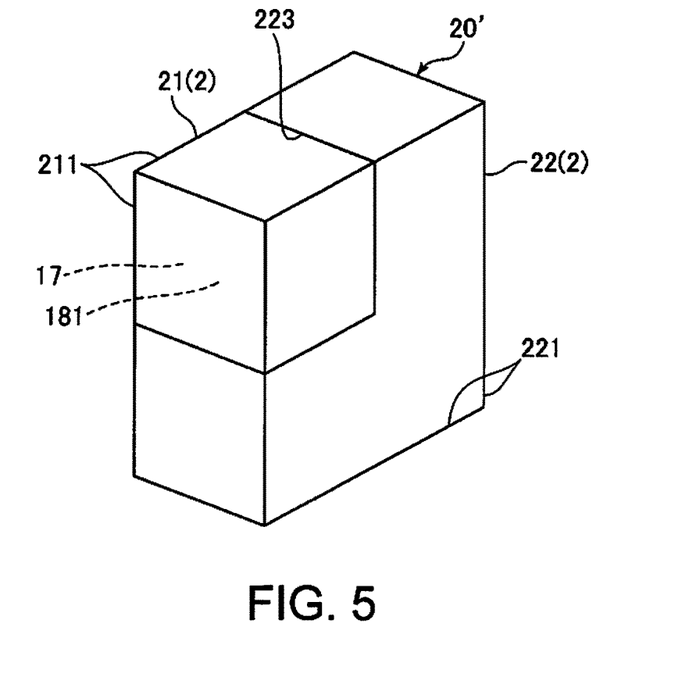
FIG. 5 is an oblique view showing an example of a step in the procedure for assembling the assembly frames shown in FIG. 3.
Figure 6:
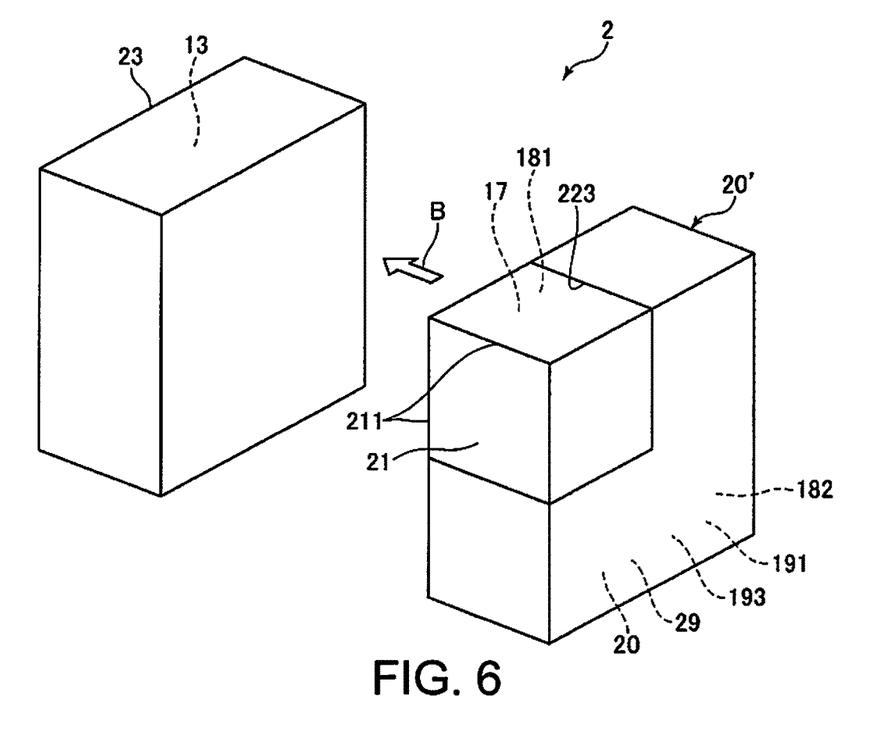
FIG. 6 is an oblique view showing an example of a step in the procedure for assembling the assembly frames shown in FIG. 3.
Figure 7:
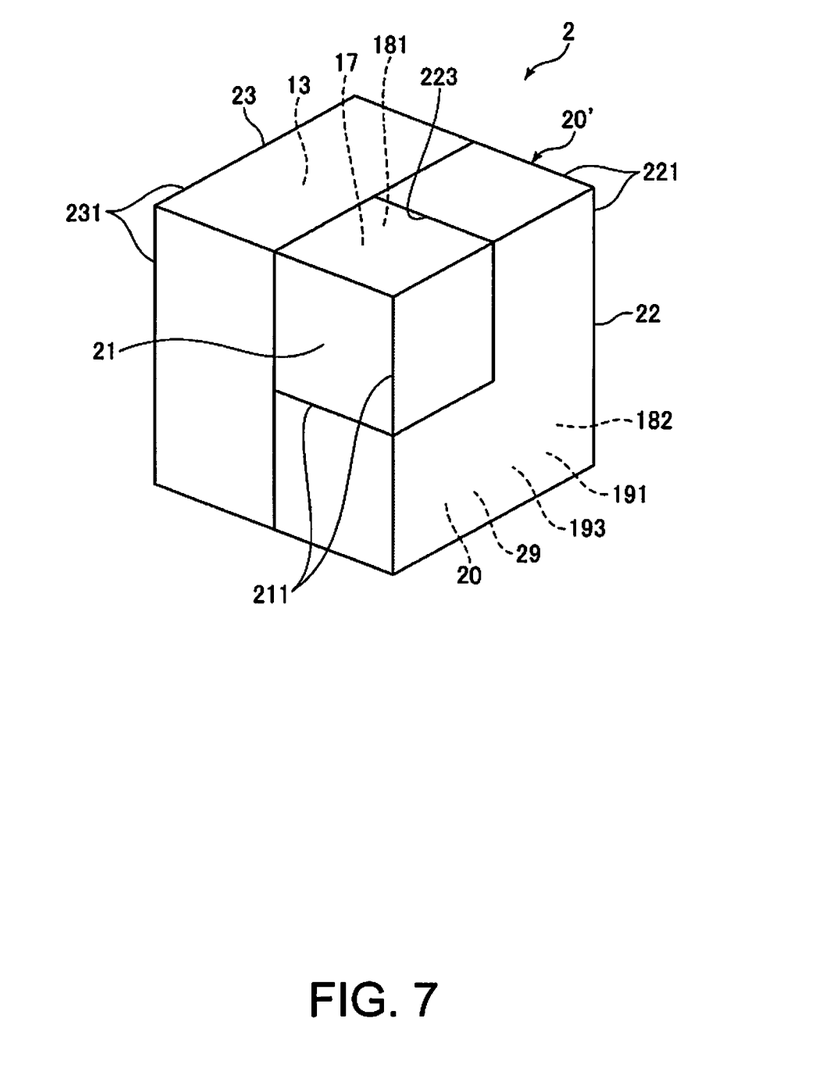
FIG. 7 is an oblique view showing an example of a step in the procedure for assembling the assembly frames shown in FIG. 3.

FIG. 1 schematically illustrates the configuration (partially in section) of a preferred embodiment of a web forming device and sheet manufacturing apparatus according to the invention. FIG. 2 is a block diagram of the sheet manufacturing apparatus shown in FIG. 1. FIG. 3 is an exploded oblique view of the assembly frames of the sheet manufacturing apparatus shown in FIG. 1. FIG. 4 is an oblique view showing an example of a step in the procedure for assembling the assembly frames shown in FIG. 3. FIG. 5 is an oblique view showing an example of a step in the procedure for assembling the assembly frames shown in FIG. 3. FIG. 6 is an oblique view showing an example of a step in the procedure for assembling the assembly frames shown in FIG. 3. FIG. 7 is an oblique view showing an example of a step in the procedure for assembling the assembly frames shown in FIG. 3.

Note that for convenience herein, the side at the top in the figures is referred to as up or above; the side at the bottom is referred to as down or below; the left side is referred to as the left or the upstream side; and the right side is referred to as the right or downstream side. Additionally for convenience below, the three mutually perpendicular axes in FIG. 1 to FIG. 3 are referred to as the X-axis, Y-axis, and Z-axis. The x-y plane containing the X-axis and Y-axis is horizontal, and the Z-axis is vertical. The direction indicated by the arrows on each axis are also referred to as the positive (+) direction, and the opposite direction as the negative (−) direction.

The configurations of parts of the sheet manufacturing apparatus 100 are described below.

As shown in FIG. 1, the sheet manufacturing apparatus 100 includes a feedstock supply device 11, a shredder 12, a defibrator 13, a classifier 14, a first web former 15, a cutter 16, a mixing device 17, a detangler 18, a second web former 19, a conveyor 29 (second web conveyor), a sheet former 20, a sheet cutter 30, a stacker 40, a dust collector 27, and a fastening assembly 2 to which these are attached.

Note that in the sheet manufacturing apparatus 100, a web forming device 1 is configured by the parts on the upstream side (the feedstock supply device 11 side) of the sheet former 20. In other words, the sheet manufacturing apparatus 100 includes a web forming device 1 and a sheet former 20.

The sheet manufacturing apparatus 100 also has wetting unit 331, wetting unit 332, wetting unit 333, wetting unit 335, and wetting unit 336. The sheet manufacturing apparatus 100 also has a blower 261, blower 262, and blower 263.

As shown in FIG. 2, parts of the sheet manufacturing apparatus 100, such as the detangler 18, second web former 19, and suction unit 193, are electrically connected to a controller 28. Operation of those parts is controlled by the controller 28.

The controller 28 includes a CPU (central processing unit) 281 and storage 282. The CPU 281 can make various decisions and assert commands. The storage 282 stores programs, including a program controlling sheet S manufacturing. This controller 28 may be built into the sheet manufacturing apparatus 100, or disposed to an external device such as an externally connected computer. The external device may connect to and communicate with the sheet manufacturing apparatus 100 through a cable or wirelessly, or connect to the sheet manufacturing apparatus 100 through a network (such as the Internet).

The CPU 281 and storage 282 may be integrated and configured as a single unit, or the CPU 281 may be incorporated in the sheet manufacturing apparatus 100 with the storage 282 disposed to an external computer or other external device, or the storage 282 may be incorporated in the sheet manufacturing apparatus 100 with the CPU 281 disposed to an external computer or other external device.

The sheet manufacturing apparatus 100 executes, in order, a feedstock supply process, a shredding process, a defibrating process, a classification process, a first web forming process, a cutting process, a mixing process, a detangling process, a second web forming process, a sheet forming process, and a sheet cutting process.

The configurations of selected parts are described below.

The feedstock supply device 11 is the part that executes the feedstock supply process supplying feedstock M1 to the shredder 12. The feedstock M1 is a sheet material containing fiber (cellulose fiber).

The cellulose fiber may be any fibrous material containing mainly cellulose (narrowly defined cellulose) as a chemical compound, and in addition to cellulose (narrowly defined cellulose) may include hemicellulose or lignin. The form of the feedstock M1 is not specifically limited, and it may be woven cloth or non-woven cloth. The feedstock M1 may also be recycled paper manufactured (recycled) by defibrating recovered paper, for example, or synthetic Yupo paper (R).

The shredder 12 is the part that executes the shredding process of shredding the feedstock M1 supplied from the feedstock supply device 11 in air (ambient air). The shredder 12 has a pair of shredder blades 121 and a chute 122.

By turning in mutually opposite directions of rotation, the pair of shredder blades 121 shred the feedstock M1 passing therebetween, that is, cut the feedstock M1 into small shreds M2. The size and shape of the shreds M2 are preferably appropriate to the defibration process of the defibrator 13, and in this example are preferably pieces 100 mm or less on a side, and are further preferably pieces that are greater than or equal to 10 mm and less than or equal to 70 mm per side.

The chute 122 is located below the pair of shredder blades 121, and in this example is funnel-shaped. As a result, the chute 122 can easily catch the shreds M2 that are shredded and dropped by the shredder blades 121.

Above the chute 122, a wetting unit 331 is disposed beside the pair of shredder blades 121. The wetting unit 331 wets the shreds M2 in the chute 122. This wetting unit 331 has a filter (not shown in the figure) containing water, and is configured as a heaterless humidifier (or heated humidifier) that supplies a moist stream of air to the shreds M2 by passing air through the filter. By wet air being supplied to the shreds M2, accumulation of shreds M2 on the chute 122 due to static electricity can be suppressed.

The chute 122 connects to the defibrator 13 through a conduit 241. The shreds M2 collected in the chute 122 passes through the conduit 241 and are conveyed to the defibrator 13.

The defibrator 13 is the part that executes the defibrating process that defibrates the shreds M2 in a dry process in air. Defibrated material M3 can be produced from the shreds M2 by the defibration process of the defibrator 13.

As used herein, defibrate means to break apart and detangle into single individual fibers shreds M2 composed of many fibers bonded together. The resulting detangled fibers are the defibrated material M3. The shape of the defibrated material M3 is strands and ribbons. The defibrated material M3 may also contain clumps, which are multiple fibers tangled together into clumps.

In this example the defibrator 13 is configured as an impeller mill having a rotor that turns at high speed, and a liner disposed around the outside of the rotor. The shreds M2 flowing into the defibrator 13 pass between the rotor and the liner and are defibrated.

The defibrator 13 also produces, by rotation of the rotor, a flow of air (an air current) from the shredder 12 to the classifier 14. As a result, the shreds M2 can be suctioned from the conduit 241 into the defibrator 13. The defibrated material M3 can also be fed through conduit 242 to the classifier 14 after defibration.

A blower 261 is disposed to the conduit 242. The blower 261 is an air current generator that produces a flow of air to the classifier 14. Conveyance of the defibrated material M3 to the classifier 14 is thereby promoted.

The classifier 14 is the part that executes the classification process of classifying the defibrated material M3 based on the length of the fibers. In the classifier 14, the defibrated material M3 is separated into first screened material M4-1, and second screened material M4-2 that is larger than the first screened material M4-1. The first screened material M4-1 is of a size appropriate to manufacturing sheets S downstream.

The average length of the fibers is preferably greater than or equal to 100 μm and less than or equal to 10 mm.

The second screened material M4-2 includes, for example, fiber that has not been sufficiently defibrated, and excessively agglomerated (clumped) defibrated fibers.

The classifier 14 includes a drum 141, and a housing 142 enclosing the drum 141.

The drum 141 is a sieve comprising a cylindrical mesh body that rotates on its center axis. The defibrated material M3 is introduced to the drum 141. By the drum 141 rotating, defibrated material M3 that is smaller than the mesh passes through and is separated as first screened material M4-1, and defibrated material M3 that is larger than the mesh and therefore does not pass through, is separated as second screened material M4-2.

The first screened material M4-1 drops from the drum 141.

The second screened material M4-2 is discharged to the conduit 243 connected to the drum 141. The end of the conduit 243 on the opposite end as the drum 141, that is, the downstream end, is connected to another conduit 241. The second screened material M4-2 that passes through the conduit 243 merges with the shreds M2 inside the conduit 241, and is introduced with the shreds M2 to the defibrator 13. As a result, the second screened material M4-2 is returned to the defibrator 13 and passes through the defibrating process with the shreds M2.

The first screened material M4-1 from the drum 141 is dispersed while dropping through air, and descends toward the first web former 15 (separator) located below the drum 141. The first web former 15 is the part that executes a first web forming process forming a first web M5 by accumulating the first screened material M4-1. The first web former 15 includes a mesh belt (separation belt) 151, three tension rollers 152, and a suction unit 153.

The mesh belt 151 is an endless belt on which the first screened material M4-1 accumulates. This mesh belt 151 is mounted on three tension rollers 152. By rotationally driving the tension rollers 152, the first screened material M4-1 deposited on the mesh belt 151 is conveyed downstream.

The size of the first screened material M4-1 is greater than or equal to the size of the mesh in the mesh belt 151. As a result, passage of the first screened material M4-1 through the mesh belt 151 is limited, and as a result the first screened material M4-1 accumulates on the mesh belt 151. Furthermore, because the first screened material M4-1 is conveyed downstream by the mesh belt 151 as the first screened material M4-1 accumulates on the mesh belt 151, the first screened material M4-1 is formed in a layer as a first web M5.

The first screened material M4-1 may also contain dust and dirt, for example. The dust and dirt may be produced during shredding and defibration. Such dust and dirt is later recovered by the dust collector 27 described below.

The suction unit 153 suctions air from below the mesh belt 151. As a result, dust and dirt that passes through the mesh belt 151 can be suctioned with the air.

The suction unit 153 is connected to a dust collector 27 through another conduit 244. Dust and dirt suctioned by the suction unit 153 is captured by the dust collector 27.

Another conduit 245 is also connected to the dust collector 27. A blower 262 is disposed to the conduit 245. Operation of the blower 262 produces suction in the suction unit 153. This promotes formation of the first web M5 on the mesh belt 151. Dust and dirt are therefore removed from the material forming the first web M5. Operation of the blower 262 causes the dust and dirt to pass through the conduit 244 to the dust collector 27.

The housing 142 is connected to a wetting unit 332. Like the wetting unit 331 described above, the wetting unit 332 is a heaterless humidifier. As a result, humidified air is supplied into the housing 142. This wet air moistens the first screened material M4-1, and as a result can suppress accretion of the first screened material M4-1 on the inside walls of the housing 142 due to static electricity.

Another wetting unit 335 is disposed downstream from the classifier 14. This wetting unit 335 is configured as an ultrasonic humidifier that mists water. As a result, moisture can be supplied to the first web M5, and the moisture content of the first web M5 can thereby be adjusted. This adjustment can also suppress accretion of the first web M5 on the mesh belt 151 due to static electricity. As a result, the first web M5 easily separates from the mesh belt 151 at the tension roller 152 from where the mesh belt 151 returns to the upstream side.

On the downstream side of the wetting unit 335 is a cutter 16. The cutter 16 is a part that executes a cutting process of cutting the first web M5 that has separated from the mesh belt 151.

The cutter 16 has a propeller 161 that is rotationally supported, and a housing 162 that houses the propeller 161. The first web M5 is cut into pieces as it is fed into the rotating propeller 161. The cut first web M5 is thus processed into fragments M6. The fragments M6 then drop down in the housing 162.

The housing 162 is connected to another wetting unit 333. Like wetting unit 331 described above, wetting unit 333 is a heaterless humidifier. As a result, humidified air is supplied into the housing 162. This wet air suppresses sticking of the fragments M6 to the propeller 161 and to the inside walls of the housing 162 due to static electricity.

A mixing device 17 is disposed on the downstream side of the cutter 16. The mixing device 17 is the part that executes a mixing process of mixing the fragments M6 with resin P. The mixing device 17 includes a resin supply device 171, a conduit (flow path) 172, and a blower 173.

The conduit 172 connects the 16 to the detangler 18, and is a flow path through which a mixture M7 of the fragments M6 and resin P passes.

The resin supply device 171 connects to the conduit 172. The resin supply device 171 has a screw feeder 174. By rotationally driving the screw feeder 174, the resin P can be supplied in powder or particle form to the conduit 172. The resin P supplied to the conduit 172 is mixed with the fragments M6, forming the mixture M7.

Note that the resin P bonds fibers together in a downstream process, and may be a thermoplastic resin or a thermosetting resin, but is preferably a thermoplastic resin. Examples of such thermoplastic resins include AS resin, ABS resin, polyethylene, polypropylene, ethylene-vinylacetate copolymer (EVA), or other polyolefin, denatured polyolefins, polymethylmethacrylate or other acrylic resin, polyvinyl chloride, polystyrene, polyethylene terephthalate, polybutylene terephthalate or other polyesters, nylon 6, nylon 46, nylon 66, nylon 610, nylon 612, nylon 11, nylon 12, nylon 6-12, nylon 6-66 or other polyimide (nylon), polyphenylene ether, polyacetal, polyether, polyphenylene oxide, polyether ether ketone, polycarbonate, polyphenylene sulfide, thermoplastic polyimide, polyether imide, aromatic polyester, or other liquid crystal polymer, styrenes, polyolefins, polyvinyl chlorides, polyurethanes, polyesters, polyimides, polybutadienes, transpolyisoprenes, fluoroelastomers, polyethylene chlorides and other thermoplastic elastomers, as well as combinations of one or two or more of the foregoing. Preferably, a polyester or resin containing a polyester is used as the thermoplastic resin.

Additives other than resin P may also be supplied from the resin supply device 171, including, for example, coloring agents for adding color to the fiber, anti-blocking agents for suppressing clumping of the fiber and clumping of the resin P, flame retardants for making the fiber and manufactured sheets difficult to burn, and paper strengtheners for increasing the strength of the sheet S. Compounds already incorporating such other additives with the resin P may also be supplied from the 171.

The blower 173 is disposed to the conduit 172 downstream from the resin supply device 171. The fragments M6 and resin P are also mixed by the action of a rotating unit such as blades of the blower 173.

The blower 173 is configured to produce an air current toward the detangler 18. This air current can also mix the fragments M6 and resin P inside the conduit 172. As a result, the mixture M7 can be introduced to the detangler 18 as a uniform dispersion of the fragments M6 and resin P. The fragments M6 in the mixture M7 are further detangled into smaller fibers while travelling through the conduit 172.

The detangler 18 is the part that executes the detangling process that detangles interlocked fibers in the mixture M7.

The detangler 18 includes a drum 181 and a housing 182 that houses the drum 181.

The drum 181 is a sieve comprising a cylindrical mesh body that rotates on its center axis. The mixture M7 is introduced to the drum 181. By the drum 181 rotating, fiber in the mixture M7 that is smaller than the mesh can pass through the drum 181. As a result, the mixture M7 is dispersed in air in the drum 181.

The dispersed mixture M7 falls through the housing 182 to the second web former 19 located below the drum 181. The drum 181 thus functions as a disperser that disperses the mixture M7 in air.

The disperser is described using a drum in this example, but the invention is not so limited and may be configured with a sprayer or shutter that opens and closes.

The housing 182 is configured as a housing enclosing the space between the drum 181 and mesh belt 191, and has an opening 182A to the −Z-axis side. This opening 182A functions as a discharge opening through which the mixture M7 passes. By accurately positioning, particularly on the Y-axis direction, the mesh belt 191 and opening 182A, the second web M8 can be deposited at the desired position on the mesh belt 191.

The second web former 19 is the part that executes the second web forming process forming a second web M8 from the mixture M7. The second web former 19 includes a mesh belt (separation belt) 191, tension rollers 192, and a suction unit 193.

The mesh belt 191 is an endless belt on which the mixture M7 accumulates. This mesh belt 191 is mounted on four tension rollers 192. By rotationally driving the tension rollers 192, the mixture M7 deposited on the mesh belt 191 is conveyed downstream.

Most of the mixture M7 on the mesh belt 191 is larger than the mesh in the mesh belt 191. As a result, the mixture M7 is suppressed from passing through the mesh belt 191, and therefore accumulates on the mesh belt 191. The mixture M7 is conveyed downstream by the mesh belt 191 as the mixture M7 accumulates on the mesh belt 191, and is formed in a layer as the second web M8.

Operation of the tension rollers 192 is controlled by the controller 28, which can set the rotational speed of the tension rollers 192 in multiple steps, for example.

The suction unit 193 can suction air down from below the mesh belt 191. As a result, the mixture M7 (second web M8) can be pulled onto the mesh belt 191, accumulation of the mixture M7 on the mesh belt 191 is thereby promoted, and the thickness of the second web M8 described below can be adjusted.

Another conduit 246 is connected to the suction unit 193. A blower 263 is also disposed to the conduit 246. Operation of the blower 263 produces suction in the suction unit 193. Operation of the blower 263 is controlled by the controller 28 (see FIG. 2).

Another wetting unit 336 is disposed below the detangler 18. This wetting unit 336 is configured as an ultrasonic humidifier similarly to the wetting unit 335 described above. As a result, moisture can be supplied to the second web M8, and the moisture content of the second web M8 can thereby be adjusted. Adjusting the moisture content can also suppress sticking of the second web M8 to the mesh belt 191 due to static electricity. As a result, the second web M8 easily separates from the mesh belt 191 at the tension roller 192 from where the mesh belt 191 returns to the upstream side.

Note that the total moisture content added by wetting unit 331 to wetting unit 336 is, for example, preferably greater than or equal to 0.5 parts by weight and less than or equal to 20 parts by weight per 100 parts by weight of the material before adding water.

The conveyor 29 is disposed on the downstream side of the second web former 19. The conveyor 29 conveys the second web M8 downstream, and includes a belt 291, and two tension rollers 292. The belt 291 is an endless belt, and is mounted on the two tension rollers 292. By rotationally driving the tension rollers 292, the belt 291 moves the accumulated second web M8. As a result, the second web M8 can be, conveyed downstream.

By accurately positioning the conveyor 29 in relation to the mesh belt 191, particularly on the Y-axis, the second web M8 can be accurately conveyed to the sheet former 20, and a sheet S of desired dimensions can be made.

The sheet former 20 is disposed on the downstream side of the conveyor 29. The sheet former 20 is the part that executes the sheet forming process of forming a sheet S from the second web M8. The sheet former 20 includes a calender 201 and a heater 202.

The calender 201 comprises a pair of calender rolls 203, and the second web M8 can be compressed without heating (without melting the resin P) by passing the second web M8 between the calender rolls 203. This process increases the density of the second web M8. The second web M8 is then conveyed toward the heater 202. Note that one of the pair of calender rolls 203 is a drive roller that is driven by operation of a motor (not shown in the figure), and the other is a driven roller.

The heater 202 has a pair of heat rollers 204, which can heat while compressing the second web M8 passing between the heat rollers 204. The combination of heat and pressure melts the resin P in the second web M8, and bonds fibers through the molten resin P. As a result, a sheet S is formed.

The sheet S is then conveyed to the sheet cutter 30. Note that one of the pair of heat rollers 204 is a drive roller that is driven by operation of a motor (not shown in the figure), and the other is a driven roller.

A sheet cutter 30 is disposed downstream from the sheet former 20. The sheet cutter 30 is the part that executes the sheet cutting process that cuts the continuous sheet S into single sheets S. The sheet cutter 30 includes a first cutter 301 and a second cutter 302.

The first cutter 301 cuts the sheet S in the direction crosswise to the conveyance direction of the sheet S.

The second cutter 302 is downstream from the first cutter 301, and cuts the sheet S in the direction parallel to the conveyance direction of the sheet S.

Sheets S of a desired size are produced by the cutting action of the first cutter 301 and the second cutter 302. The sheets S are then conveyed further downstream and stacked in a stacker 40.

The fastening assembly 2 is described in detail below. Only major parts of the sheet manufacturing apparatus 100 are described below as examples of parts attached to the fastening assembly 2.

Note that herein (A) is affixed to or affixes (B) means that (B) is supported in a fixed position to (A), including directly affixed such as by welding, and indirectly affixed through a mechanism or members such as by fastening with nuts and bolts. When (A) is affixed to (B), the position of (B) relative to (A) is fixed. In this case, all or part of (A) may be movable in relation to (B).

Examples of (A) in the above definition include the defibrator 13, drum 181 (disperser), housing 182, mesh belt 191, suction unit 193, conveyor 29, and sheet former 20.

Examples of (B) include a first fixing frame 21 (first fixing assembly), a second fixing frame 22 (second fixing assembly), and a third fixing frame 23 (third fixing assembly).

As shown in FIG. 3, the fastening assembly 2 includes a first fixing frame 21, a second fixing frame 22, and a third fixing frame 23, which are separable from each other. The first fixing frame 21, second fixing frame 22, and third fixing frame 23 can be assembled and disassembled, that is, can be in a disassembled state (separated state) as shown in FIG. 3, and an assembled state as shown in FIG. 7.

The first fixing frame 21 comprises twelve rectangular frame members 211 (rectangular rods), the ends of which are connected together to form a rectangular framework. This first fixing frame 21 functions to support, that is, to affix, the mixing device 17 and drum 181 in fixed positions.

Where the mixing device 17 and drum 181 are affixed in the first fixing frame 21 is not specifically limited, and in one example are affixed to a panel mounted on the +z side surface 212 of the −z side frame members 211.

The method of affixing the mixing device 17 and drum 181 to the frame members 211 is not specifically limited, and may be by fusing, bonding, or welding methods, fitting or swaging methods, or by using fasteners such as nuts and bolts.

The second fixing frame 22 comprises sixteen rectangular frame members 221 (rectangular rods), the ends of which are connected together to form a rectangular L-shaped framework. More specifically, the second fixing frame 22 has a recess 223. As shown in FIG. 5, the first fixing frame 21 is inserted and affixed to this recess 223 of the second fixing frame 22.

The second fixing frame 22 functions to support, that is, to affix, the housing 182, mesh belt 191, suction unit 193, conveyor 29, and sheet former 20.

The method of affixing the housing 182, mesh belt 191, suction unit 193, conveyor 29, and sheet former 20 in the second fixing frame 22 is not specifically limited, and may be by fusing, bonding, or welding methods, fitting or swaging methods, or by using fasteners such as nuts and bolts to affix them to a panel mounted on the +z side surface 222 of the −z side frame members 221.

The method of affixing the housing 182, mesh belt 191, suction unit 193, conveyor 29, and sheet former 20 to the frame members 221 is also not specifically limited, and may be by fusing, bonding, or welding methods, fitting or swaging methods, or by using fasteners such as nuts and bolts.

The third fixing frame 23 comprises twelve rectangular frame members 231 (rectangular rods), the ends of which are connected together to form a rectangular framework. More specifically, as shown in FIG. 6 and FIG. 7, the third fixing frame 23 can be affixed to the assembly comprising the assembled first fixing frame 21 and second fixing frame 22.

The third fixing frame 23 functions to functions to support, that is, to affix, the defibrator 13 and parts on the upstream side thereof inside the third fixing frame 23.

Where the defibrator 13 and other parts are affixed in the third fixing frame 23 is not specifically limited, and in one example are affixed to a panel mounted on the +z side surface 232 of the −z side frame members 231.

The method of affixing the defibrator 13 to the frame members 231 is not specifically limited, and any of the methods described above may be used.

The method of disconnectably assembling the first fixing frame 21, second fixing frame 22, and third fixing frame 23 is not specifically limited, and may be by means of a mating mechanism disposed to each of the first fixing frame 21, second fixing frame 22, and third fixing frame 23, such as by providing matching recesses and protrusions to the fixing members and mating these recesses and protrusions, or by fitting or swaging methods, or by fastening the fixing members through fasteners such as bolts or screws.

Because the first fixing frame 21, second fixing frame 22, and third fixing frame 23 are configured by frameworks, when fixing parts to the first fixing frame 21, second fixing frame 22, and third fixing frame 23, the worker's hands can be inserted between the frame members, making work easier. The weight of the first fixing frame 21, second fixing frame 22, and third fixing frame 23 can also be reduced, and this further facilitates assembling the first fixing frame 21, second fixing frame 22, and third fixing frame 23.

The material used for the first fixing frame 21, second fixing frame 22, and third fixing frame 23 may be metal or plastic, for example.

An example of the sheet manufacturing apparatus 100 assembly process is described next with reference to FIG. 4 to FIG. 7. Note that the first fixing frame 21, second fixing frame 22, and third fixing frame 23 are shown schematically in FIG. 4 to FIG. 7.

First, the components of the sheet manufacturing apparatus 100 described above are prepared. The mixing device 17 and drum 181 are then affixed to the first fixing frame 21; the housing 182, mesh belt 191, suction unit 193, conveyor 29, and sheet former 20 are affixed to the second fixing frame 22; and the defibrator 13 is affixed to the third fixing frame 23.

Next, as indicated by the arrow A in FIG. 4, the first fixing frame 21 is inserted to the recess 223 of the second fixing frame 22. Then as shown in FIG. 5, the first fixing frame 21 and second fixing frame 22 are affixed in position, forming assembly 20'. As a result, the mixing device 17 and drum 181 affixed to the first fixing frame 21, and the housing 182, mesh belt 191, suction unit 193, conveyor 29, and sheet former 20 affixed to the second fixing frame 22, are fastened in a fixed position relative to each other.

Next, as indicated by the arrow B in FIG. 6, the assembly 20' of the first fixing frame 21 and second fixing frame 22 is affixed to the third fixing frame 23 to which the defibrator 13 is affixed. As a result, as shown in FIG. 7, the defibrator 13, and the mixing device 17 and drum 181 affixed to the first fixing frame 21, and the housing 182, mesh belt 191, suction unit 193, conveyor 29, and sheet former 20 are fastened in a fixed position relative to each other.

By then connecting the conduits not shown of the parts described above, the assembled sheet manufacturing apparatus 100 is completed.

Because the first fixing frame 21, second fixing frame 22, and third fixing frame 23 are sequentially assembled so that the relative positions of the defibrator 13, mixing device 17, drum 181, housing 182, mesh belt 191, suction unit 193, conveyor 29, and sheet former 20 of the sheet manufacturing apparatus 100 are sequentially fixed, shifting of the relative positions of parts due to assembly can be prevented or suppressed compared with a configuration in which all of the component parts are affixed to a single fixing member (frame).

In addition, when the sheet manufacturing apparatus 100 is to be installed in a space with a narrow entrance, for example, the sheet manufacturing apparatus 100 can be easily installed by delivering the first fixing frame 21, second fixing frame 22, and third fixing frame 23 in the disassembled state, and then assembling them in place.

Furthermore, because the mesh belt 191, suction unit 193, and calender rolls 203 (pressure rollers) are configured affixed to a single second fixing frame 22, the mesh belt 191, suction unit 193, and calender rolls 203 can be precisely positioned, and the second fixing frame 22 can then be affixed to the first fixing frame 21 and second fixing frame 22.

More specifically, when assembling the first fixing frame 21, second fixing frame 22, and third fixing frame 23, the relative positions of the mesh belt 191, suction unit 193, and calender rolls 203 are fixed and maintained by the second fixing frame 22. Therefore, when the sheet manufacturing apparatus 100 is operated, the second web M8 can be accumulated at the desired position, suctioned at the desired position, and compressed at the desired position. As a result, wrinkles in the sheet S, for example, caused by deviation in the calendering position can be prevented or reduced.

Furthermore, because the mesh belt 191, housing 182, and suction unit 193 are configured affixed to a single second fixing frame 22, the second fixing frame 22 can be affixed to the first fixing frame 21 and third fixing frame 23 with the mesh belt 191, housing 182, and suction unit 193 fixed in position relative to each other. More specifically, when assembling the first fixing frame 21, second fixing frame 22, and third fixing frame 23, the mesh belt 191, housing 182, and suction unit 193 are held in the correct positions relative to each other.

As a result, when the sheet manufacturing apparatus 100 operates, the mixture M7 can be discharged at the desired position, and the second web M8 can be accumulated at the desired position and suctioned at the desired position. As a result, the thickness of the second web M8 can be kept as uniform as possible, and the acquired sheet S will have the desired thickness.

As described above, the web forming device 1 includes a drum 181 (disperser) that disperses a mixture M7 (defibrated material) containing a defibrated material of defibrated fiber; a mesh belt 191 (accumulator) that accumulates the mixture M7 (defibrated material) dispersed by the drum 181 (disperser); a suction unit 193 disposed on the opposite side of the mesh belt 191 (accumulator) as the drum 181 (disperser); calender rolls 203 (pressure rollers) that compress the second web M8 (accumulated material) accumulated on the mesh belt 191 (accumulator); and a fastening assembly 2 that can be disassembled into a first fixing frame 21 and a second fixing frame 22. The drum 181 (disperser) is affixed to the first fixing frame 21, and the mesh belt 191 (accumulator), suction unit 193, and a conveyor 29 are affixed to the second fixing frame 22.

As a result, when the sheet manufacturing apparatus 100 is to be installed in a space with a narrow entrance, for example, the sheet manufacturing apparatus 100 can be easily installed by delivering the first fixing frame 21, second fixing frame 22, and third fixing frame 23 in the disassembled state, and then assembling them in place.

Furthermore, because the mesh belt 191, suction unit 193, and calender rolls 203 are configured affixed to a single second fixing frame 22, the mesh belt 191, suction unit 193, and calender rolls 203 can be affixed in the desired relative positions, and the second fixing frame 22 can then be affixed to the first fixing frame 21.

More specifically, when assembling the first fixing frame 21 and second fixing frame 22, the relative positions of the mesh belt 191, suction unit 193, and calender rolls 203 are fixed and maintained. Therefore, when the sheet manufacturing apparatus 100 is operated, the second web M8 can be accumulated at the desired position, suctioned at the desired position, and calendered at the desired position. As a result, wrinkles in the sheet S, for example, caused by deviation in the compression position can be prevented or reduced.

Furthermore, the second fixing frame 22 is configured by a framework, and affixes the mesh belt 191, suction unit 193, and calender rolls 203 inside. Because the second fixing frame 22 is configured as a framework, the worker's hands can be inserted between the frame members, making work easier when affixing the mesh belt 191, suction unit 193, and calender rolls 203 to the second fixing frame 22. Assembly is thereby simplified.

As described above, the web forming device 1 includes a drum 181 (disperser) that disperses a mixture M7 (defibrated material) containing a defibrated material of defibrated fiber; a mesh belt 191 (accumulator) that accumulates the mixture M7 (defibrated material) dispersed by the drum 181 (disperser); a housing 182 enclosing the space between the drum 181 (disperser) and the mesh belt 191 (accumulator); a suction unit 193 disposed on the opposite side of the mesh belt 191 (accumulator) as the drum 181 (disperser); and a fastening assembly 2 that can be disassembled into a first fixing frame 21 and a second fixing frame 22. The drum 181 (disperser) is affixed to the first fixing frame 21, and the mesh belt 191 (accumulator), housing 182, and suction unit 193 are affixed to the second fixing frame 22.

As a result, when the sheet manufacturing apparatus 100 is to be installed in a space with a narrow entrance, for example, the sheet manufacturing apparatus 100 can be easily installed by delivering the first fixing frame 21, second fixing frame 22, and third fixing frame 23 in the disassembled state, and then assembling them in place.

Furthermore, because the mesh belt 191, housing 182, and suction unit 193 are configured affixed to a single second fixing frame 22, the mesh belt 191, housing 182, and suction unit 193 can be affixed in the desired relative positions, and the second fixing frame 22 can then be affixed to the first fixing frame 21.

More specifically, when assembling the first fixing frame 21 and second fixing frame 22, the relative positions of the mesh belt 191, housing 182, and suction unit 193 are fixed and maintained. Therefore, when the sheet manufacturing apparatus 100 is operated, mixture M7 can be discharged at the desired position, and the second web M8 can be accumulated at the desired position and suctioned at the desired position. As a result, wrinkles in the sheet S, for example, caused by deviation in the compression position can be prevented or reduced. As a result, the thickness of the second web M8 can be kept as uniform as possible, and the acquired sheet S will have the desired thickness.

Furthermore, the second fixing frame 22 is configured by a framework, and affixes the mesh belt 191, housing 182, and suction unit 193 inside. Because the second fixing frame 22 is configured as a framework, the worker's hands can be inserted between the frame members, making work easier when affixing the mesh belt 191, housing 182, and suction unit 193 to the second fixing frame 22.

The web forming device 1 has a mixing device 17 that supplies resin P to the shreds M6 (defibrated material) and mixes the shreds M6 (defibrated material) with the resin P, and the mixing device 17 is affixed to the first fixing frame 21. By affixing the mixing device 17 to the first fixing frame 21, the number of parts affixed to the third fixing frame 23 can be prevented from becoming too great. As a result, parts can be desirably distributed between the first fixing frame 21, second fixing frame 22, and third fixing frame 23. This can prevent the final assembly of any of the first fixing frame 21, second fixing frame 22, and third fixing frame 23 from being too heavy.

Including a defibrator 13 that defibrates fiber and produces shreds M6 (defibrated material), the fastening assembly 2 has a third fixing frame 23 that is removably connected to at least one of the first fixing frame 21 and second fixing frame 22, and the defibrator 13 is affixed to the third fixing frame 23. Because the defibrator 13 and mixing device 17 can be connected relatively easily, there is no need for precise positioning, and by separating the fixing frame (third fixing frame 23) to which the defibrator 13 is affixed from the fixing frame (first fixing frame 21) to which the mixing device 17 is affixed, the number of parts affixed to the second fixing frame 22 can be prevented from becoming too great. As a result, parts can be desirably distributed between the first fixing frame 21, second fixing frame 22, and third fixing frame 23. This can prevent the final assembly of any of the first fixing frame 21, second fixing frame 22, and third fixing frame 23 from being too heavy.

The sheet manufacturing apparatus 100 includes a web forming device 1, and a sheet former 20 that compresses a second web M8 (accumulated material) into a sheet, and the sheet former 20 is affixed to the second fixing frame 22. As a result, a second web M8 of desired dimensions can be formed precisely into sheets as described above. Sheets S of desired dimensions can therefore be more reliably acquired.

Preferred embodiments of a web forming device and sheet manufacturing apparatus according to the invention are described above with reference to the accompanying figures, but the invention is not so limited, and parts of the web forming device and sheet manufacturing apparatus may be replaced by desirable configurations having the same function. Other desirable components may also be added.

Furthermore, the assembly frame (affixing member) is configured as a frame in the foregoing embodiment, but the invention is not so limited and may be configured as a housing, for example.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

The entire disclosure of Japanese Patent Application No: 2018-115514, filed Jun. 18, 2018 is expressly incorporated by reference herein.

What is claimed is:

1. A web forming device comprising:
   a disperser configured to disperse in air defibrated material containing a defibrated material of defibrated fiber;
   an accumulator configured to accumulate the defibrated material dispersed by the disperser;
   a housing enclosing a space between the disperser and the accumulator;
   a suction device disposed on the opposite side of the accumulator as the disperser; and
   a fastening assembly including a first fixing assembly and a second fixing assembly that are removably attached to each other;
   the disperser affixed to the first fixing assembly, and
   the accumulator, housing, and suction device affixed to the second fixing assembly.

2. The web forming device described in claim 1, wherein:
   the second fixing assembly is configured as a frame, and affixes thereinside the accumulator, the housing, and the suction device.

3. The web forming device described in claim 1, further comprising:
   a mixer configured to supply resin to the defibrated material, and mix the defibrated material and resin;
   the mixer being affixed to the first fixing assembly.

4. The web forming device described in claim 1, further comprising:
   a defibrator configured to defibrate fiber and produce the defibrated material;
   the fastening assembly further including a third fixing assembly removably attachable to at least one of the first fixing assembly and the second fixing assembly, and
   the defibrator being affixed to the third fixing assembly.

5. A sheet manufacturing apparatus comprising:
   a disperser configured to disperse in air defibrated material containing a defibrated material of defibrated fiber;
   an accumulator configured to accumulate the defibrated material dispersed by the disperser;
   a suction device disposed on the opposite side of the accumulator as the disperser; and
   a pressure roller configured to compress defibrated material accumulated on the accumulator; and
   a fastening assembly including a first fixing assembly and a second fixing assembly that are removably attached to each other;
   the disperser affixed to the first fixing assembly, and
   the accumulator, suction device, and pressure roller affixed to the second fixing assembly.

6. The sheet manufacturing apparatus described in claim 5, wherein:
   the second fixing assembly is configured as a frame, and affixes thereinside the accumulator, the suction device, and the pressure roller.

* * * * *